Jan. 20, 1931.  E. M. LONG  1,789,942
LENS CUTTER
Filed Sept. 19, 1927
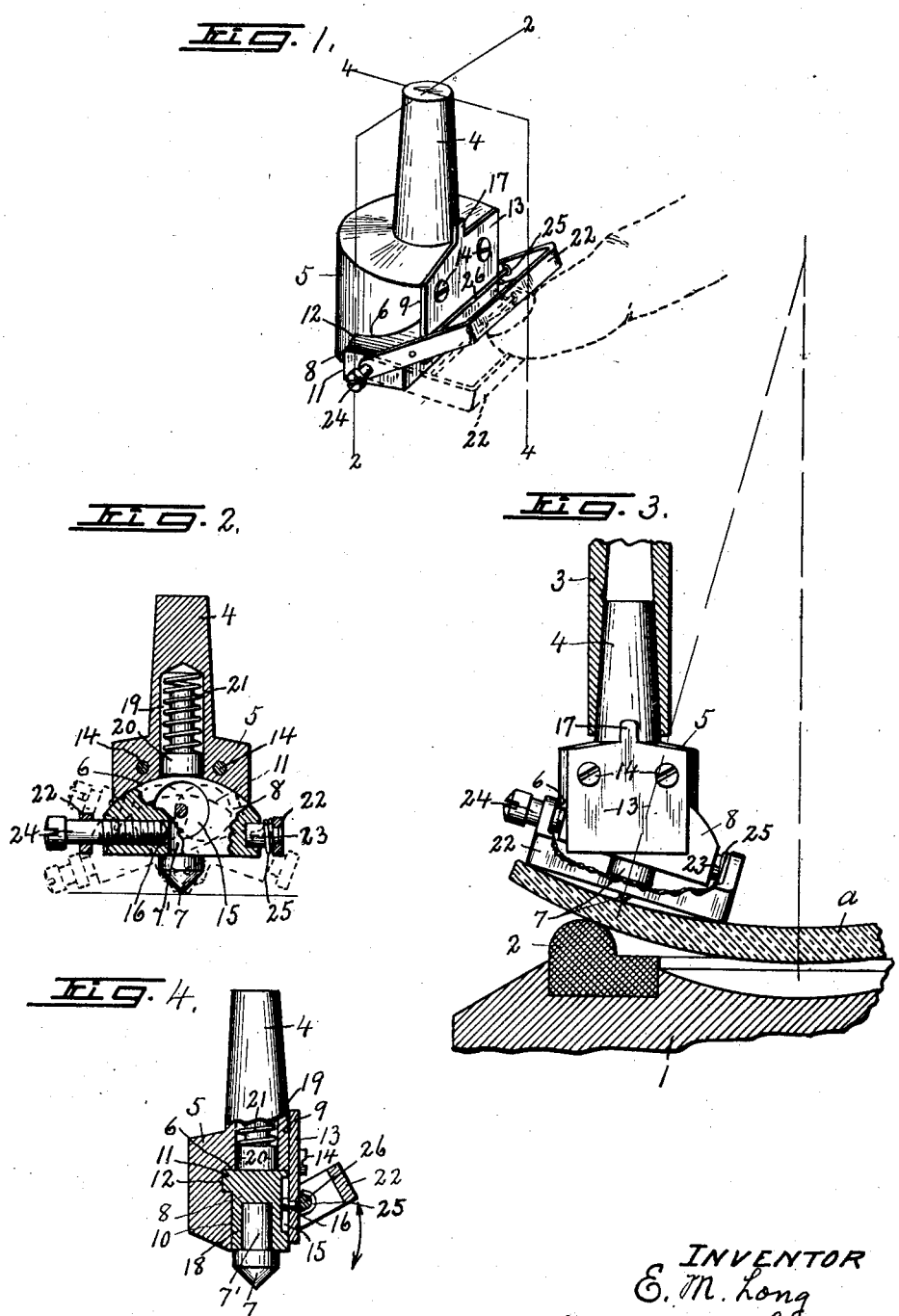
INVENTOR
E. M. Long
BY Denison & Thompson
ATTORNEYS.
WITNESS
H. H. Hurst Patented Jan. 20, 1931

1,789,942

UNITED STATES PATENT OFFICE

ELI MAYNARD LONG, OF GENEVA, NEW YORK, ASSIGNOR TO SHUR-ON STANDARD OPTICAL COMPANY, INC., OF GENEVA, NEW YORK, A CORPORATION OF NEW YORK

LENS CUTTER

Application filed September 19, 1927. Serial No. 220,482.

This invention relates to a lens cutting machine of the class set forth in my Patent 1,676,566, July 10, 1928, but more particularly to the means for adjusting and setting the cutting tool normal to the surfaces of lenses of different contours.

In my application referred to is shown a tool holder somewhat similar to the Bader Patent No. 1,176,707, March 21, 1916, in which the adjustment of the cutting tool is effected by means of a contact roller on the tilting tool holder engaging and riding upon the surface of the work during the cutting operation of rotating the work against the cutter.

In the use of this roller contact while efficient in maintaining the tool in normal relation to the surface of the work it frequently happens that small particles of abrasive material will be caught between the roller and lens or upon the periphery of the roller and cause more or less etching or scratching of the lens to such an extent as to render the lens unfit for use unless reground.

The main object of the present invention is to provide a device of this character in which the cutting tool is adjusted or set normal to the surface of the work by means of a bar carried by the tilting tool holder and adapted to be pressed by the finger against said surface so that the contact will automatically set the cutting tool to its proper cutting angle and when the pressure is released the bar will be automatically withdrawn from the lens leaving the cutter in its adjusted position and avoiding the objectionable etching or scratching of the lens previously mentioned.

Other objects and uses relating to specific parts of the invention will be brought out in the following description.

In the drawings:—

Figure 1 is a perspective view of a tool holder embodying the various features of my invention.

Figures 2 and 4 are enlarged sectional views taken respectively in the planes of lines 2—2 and 4—4, Figure 1.

Figure 3 is a further enlarged sectional view partly in elevation, of the same device and portions of the work-table and supporting shaft for the tool-holder.

This lens-cutter is adapted to be used in cooperation with a rotary work-holder or table —1— having a suitable elastic pad —2— for receiving and supporting the work, such as the lens —a— co-axial therewith in a manner somewhat similar to my patent above referred to.

The tool holder is supported in and upon a vertical rock-shaft —3— at one side of the axis of rotation of the table —1— according to the radius or radii of the lens to be cut, and comprises a tapered spindle —4— tightly fitted in a tapered base in the rock-shaft —3—, and provided with a head —5— having a circular guide —6— in its lower end, the center of which is located in the produced axis of the spindle —4— and shaft —3— as nearly as possible at the cutting point of the tool —7— for receiving and supporting a tiltable tool-carrier —8—, and permitting said carrier to be adjusted angularly along the guide —6— and about the center —7— thereof.

The head —5— forming the larger lower end of the spindle —4— is mainly cylindrical, but has one side thereof flattened at —9— in a plane parallel with the axis of the spindle, and substantially coincident with the adjacent face of the base of the tapered portion —4—, said head having a recess —10— extending inwardly from the flattened side —9— beyond the axis of the spindle, and open at the bottom for receiving the tool-carrier —8— and also to form a part of the guide —6—.

The top wall of the recess —10— and upper face of the carrier —8— are both curved to substantially the same radius, having their center in the axis of the spindle —4— and approximately at the cutting point of the cutter —7— so as to engage each other and permit lateral rocking movement of the carrier —8— about said center. The carrier is held against endwise displacement from the recess —10— by means of a circular rib —11— formed on the rear side of the carrier opposite the flattened side —9— of the spindle head —5— and adapted to enter a corresponding groove 12 of the recess —10—, as shown more clearly in Fig. 4, thereby forming a part of the circular guide in which the carrier —8— is movable. The carrier —8— is held against lateral displacement through the open side of the recess —10— by means of a plate —13— which is secured by screws —14— to the flat side —9— of the head —5— above the recess —10— to extend downwardly across the front side of the recess and adjacent side of the tool-carrier —8— to assist in guiding the tool-carrier in its angular movements.

The side of the carrier —8— adjacent to plate —13— is provided with a recess —15— for receiving a stop-pin —16— on the plate —13— for limiting the angular movement of the carrier —8— in the guide —6—. The upper end of the plate is provided with a relatively small projection —17— adapted to enter a notch in the wall of the lower end of the socket of the rock-shaft —3— to lock said rock-shaft and spindle against relative rotation and, through the medium of the guide —6— in the head —5—, to hold the carrier —8— in a plane approximately radial to the work-holder —1—, as shown more clearly in Figure 3.

The cutting tool —7— is provided with a reduced shank —7'— fitted in a socket —18— in the lower side of the carrier —8— and held by screw 24 radial to the upper curved surface of said carrier so as to move therewith with its cutting point at approximately the center of curvature.

The purpose of this angular adjustment of the carrier —8— is to keep the cutting point of the cutting tool —7— substantially normal, or at right angles to the surface of the work, such as the lens —a— in which the surface operated upon is shown as concave, but obviously the carrier may be adjusted to bring the cutting point normal to a convex surface, when desired.

Suitable means is provided for frictionally holding the carrier —8— in different positions of adjustment, and for this purpose the spindle is provided with a coaxial socket —19— extending upwardly from the guide —10— for receiving a brake-shoe —20— which is yieldingly held against the periphery of the carrier —8— by a spring —21—.

The means for adjusting and seating the carrier —8— and its cutter —7— to their proper cutting positions with the cutting point of the tool —7— substantially normal to the surface of the work operated upon, comprises in this instance, a U-shaped bar or contact member —22— extending across the front face of the plate —13— in spaced relation thereto, and having its opposite arms pivotally connected by trunnions —23— and —24— to opposite ends of the carrier —8— to permit the intermediate portion of the bar —22— to be pressed by the finger against the surface of the work whether flat, concave or convex, and thereby to bring the axis of the cutting tool —7— normal, or substantially at right angles to the portion of said surface to be cut by the cutter.

As illustrated, the lower edge of the bar —22— is substantially straight and extends equal distances beyond the axis of the cutting tool so that when engaged with the surface of the work, the tool will be normal to said surface, as shown more clearly in Figure 3, in which the dotted lines indicate that the produced axis of the tool intersects the axis of the surface operated upon at the center, or curvature of said surface, and therefore at right angles thereto.

Trunnions —23— and —24— are coaxial and their axis is disposed in a plane parallel with the flat surface of the head —5— and intersecting the axis of the spindle —4— at right angles thereto so that the straight edge of the bar —22— will always be at right angles to the axis of the cutting tool —7— in different positions of adjustment of the carrier —8—. Any suitable means may be provided for returning the bar —22— to its normal up position, said means consisting, in this instance, of a spring —25— having one end coiled around the trunnion —23— and engaged with the adjacent end of the carrier —7—, and its other end engaged with a cross-bar —26— connecting the opposite arms of the bar —22— between said bar and the plate —13—, said bar —26— also serving as a limiting stop adapted to engage the front face of the plate —13— for limiting the upward movement of the bar —22— by its spring —25—.

*Operation*

When it is desired to cut a lens, the latter is placed in proper position upon the rotary table —1—, which is then elevated by any suitable means to bring the upper surface of the lens to be cut against the cutting point of the tool —7— at which time the bar —22— will be depressed by the finger to engage the work surface operated upon, as shown in Fig. 3, thereby presenting the cutting point of the tool normal to the surface of the lens, after which the pressure upon the bar —22— is released to permit the latter to be returned out of engagement with the lens to its normal up position by the spring —25—.

When this adjustment of the carrier —8— and cutting tool is made in the manner just described and the table —1— is elevated, Figure 3, to press the upper surface of the lens against the tool —7—, the table is then rotated to produce the desired cutting of the lens. During this cutting operation, the bar —22— is clear from engagement with the surface of the lens, thereby avoiding any liability of etching or scratching the glass in case particles of abrasive material may lodge upon the lens.

It will be observed that when this device is used for cutting concave surfaces the bar —22— will have at least two points with said surface in a straight line across the cord of the arc of curvature thus bringing the cutter normal or at right angles to the curved surface.

On the other hand, when the device is used for cutting convex surfaces the downward pressure on the central portion of the member —22— will bring the central portion of its contacting edge substantially tangential to the curved surface thereby setting the cutter normal or at right angles to the surface.

It will be evident, however, that various other forms of contact members may be used without departing from the spirit of this invention so long as the contacting member is adapted to be depressed at will into contact with the surface to be cut for setting the cutting tool normal to said surface and is held out of contact with the work during the cutting operation.

What I claim is:—

1. In a lens-cutting machine, a spindle, a cutting tool holder operatively mounted on the spindle and tiltable to different angles relatively thereto about approximately the cutting point of the tool, and means pivoted to the tool holder to move into and out of contact with the lens and operable at will for setting the tool holder at the desired angle, said means being out of contact with the lens during the cutting operation.

2. In a lens cutting machine, a spindle, a cutting tool holder operatively mounted on the spindle and tiltable to different angles relatively thereto about approximately the cutting point of the tool, and a contact member operatively connected to the tool holder and adapted to be pressed against the surface of the lens to be cut for setting the tool normal to said surface, and means for moving said contact member away from said surface when the pressure is removed.

3. In a lens cutting machine, a spindle head, a cutting-tool holder tiltably mounted on the head to move about the cutting point of the tool as a center, and a contact bar pivotally connected to the tool-holder and adapted to be pressed into contact with the surface of the work for tilting the tool holder and placing the tool normal to said surface.

4. In a lens-cutting machine, a spindle head, a tool-holder mounted on the head to tilt substantially about the cutting point of the tool, means attached to the tool holder for tilting the same and having an independent movement relatively to said holder into and out of engagement with the surface of the work, and yielding means for holding the first-named means out of engagement with the work during the cutting operation.

In witness whereof I have hereunto set my hand this 13th day of Sept. 1927.

ELI MAYNARD LONG.